(12) United States Patent
Wolf et al.

(10) Patent No.: US 12,618,764 B2
(45) Date of Patent: May 5, 2026

(54) DEVICES, SYSTEMS, AND METHODS FOR CONTROLLING INSECTS IN A SMOKE DETECTOR DEVICE

(71) Applicant: Honeywell International Inc., Charlotte, NC (US)

(72) Inventors: Benjamin H. Wolf, Leicester (GB); Michael Barson, Nuneaton (GB); Christopher Dearden, Melton Mowbray (GB)

(73) Assignee: Honeywell International Inc., Charlotte, NC (US)

( * ) Notice: Subject to any disclaimer, the term of this patent is extended or adjusted under 35 U.S.C. 154(b) by 223 days.

(21) Appl. No.: 17/826,618

(22) Filed: May 27, 2022

(65) Prior Publication Data

US 2023/0384198 A1 Nov. 30, 2023

(51) Int. Cl.
*G01N 15/06* (2024.01)
*A01M 1/20* (2006.01)
(Continued)

(52) U.S. Cl.
CPC .............. *G01N 15/06* (2013.01); *A01M 1/20* (2013.01); *G08B 29/145* (2013.01); *A01M 2200/01* (2013.01); *G01N 15/075* (2024.01)

(58) Field of Classification Search
CPC ........... G01N 21/0332; G01N 21/8422; G01N 2021/0389; G01N 2021/8427; G01N 21/9501; C30B 25/14; C30B 25/16; C30B 25/10; H01L 21/67253; C23C 16/46; C23C 16/482; C23C 16/52
See application file for complete search history.

(56) References Cited

U.S. PATENT DOCUMENTS 4,151,414 A * 4/1979 Fite ....................... H01J 49/025
250/281
5,926,098 A * 7/1999 Wiemeyer ............ G08B 17/113
340/630
(Continued)

FOREIGN PATENT DOCUMENTS

CA 874662 A 6/1971
CN 1954674 5/2007
(Continued)

OTHER PUBLICATIONS

Cloute-Cazalaa, "Economical Smoke Detector Avoids False Alarms"; Electronic Design, Sep. 19, 2011 (14 pgs) https://www.electronicdesign.com/technologies/analog/article/21793959/economical-smoke detector-avoids-false-alarms.

*Primary Examiner* — Michelle M Iacoletti
*Assistant Examiner* — Maher Yazback
(74) *Attorney, Agent, or Firm* — Brooks, Cameron & Huebsch, PLLC

(57) ABSTRACT

Devices, systems, and methods for controlling insects in a smoke detector device are described herein. One insect controlling smoke detector device, includes a housing having a smoke detecting chamber formed therein, a light source directing a light beam through the smoke detecting chamber, a light sensor to receive a portion of the light beam and analyze the received light beam to determine whether smoke particles are present in the chamber, and an insecticide injecting apparatus to inject insecticide into the chamber.

5 Claims, 2 Drawing Sheets

(51) Int. Cl.
  G01N 15/075     (2024.01)
  G08B 29/14     (2006.01)

(56)        References Cited

U.S. PATENT DOCUMENTS

| 6,522,254 | B1 * | 2/2003 | Yamano | G08B 17/107 |
| | | | | 340/630 |
| 7,978,087 | B2 | 7/2011 | Siber et al. | |
| 2009/0009345 | A1 * | 1/2009 | Conforti | G08B 17/113 |
| | | | | 340/627 |
| 2010/0073172 | A1 * | 3/2010 | Lax | G08B 17/10 |
| | | | | 340/630 |
| 2010/0328082 | A1 * | 12/2010 | Danz | G08B 17/10 |
| | | | | 340/584 |
| 2011/0037971 | A1 | 2/2011 | Loepfe et al. | |
| 2011/0123655 | A1 * | 5/2011 | Robinson | A01N 65/00 |
| | | | | 106/18.32 |
| 2013/0026400 | A1 * | 1/2013 | Allen, Jr. | A01M 7/0046 |
| | | | | 251/129.01 |
| 2013/0061659 | A1 * | 3/2013 | Ajay | G08B 17/113 |
| | | | | 73/28.04 |
| 2015/0241330 | A1 * | 8/2015 | Knox | G01N 21/53 |
| | | | | 356/337 |
| 2020/0064248 | A1 * | 2/2020 | Houck | G01N 15/0211 |
| 2020/0302767 | A1 * | 9/2020 | Sugizaki | G08B 17/107 |
| 2021/0065536 | A1 * | 3/2021 | Dearden | G08B 17/10 |

FOREIGN PATENT DOCUMENTS

| CN | 102054324 | A | * | 5/2011 | G08B 29/24 |
| CN | 204203190 | U | | 3/2015 | |
| EP | 2320397 | A1 | * | 5/2011 | G08B 17/113 |
| EP | 3828845 | | | 6/2021 | |
| JP | 2005293306 | | | 10/2005 | |
| JP | 4167617 | B2 | | 10/2008 | |
| WO | WO-2009052991 | A1 | * | 4/2009 | G01N 21/53 |
| WO | 2018069473 | | | 4/2018 | |
| WO | WO-2018069473 | A1 | * | 4/2018 | G08B 17/10 |

* cited by examiner

DEVICES, SYSTEMS, AND METHODS FOR CONTROLLING INSECTS IN A SMOKE DETECTOR DEVICE

TECHNICAL FIELD

The present disclosure relates to devices, systems, and methods for insect control in smoke detector devices.

BACKGROUND

Fire alarm systems around the world rely on people trusting that, when they are activated, that they are giving correct information that there is a real life safety event/emergency. One the biggest causes in people 'losing faith' in the alarm being raised is when they have suffered from false alarms. In many instances, the local fire service may even fine the building owner when being incorrectly called out to an event. Accordingly, avoiding false alarms is a key requirement for any building owner.

In many places in the world, insects crawling around or flying around in the smoke detector chamber of a smoke detector device can be a major cause of false alarms in fire alarm systems, as it is very difficult for a light source (e.g., a photo LED) sensing apparatus to be able to distinguish between real smoke and small insects. Consequently, an alarm may be raised incorrectly when insects are moving around in the sensing chamber. For example, in Europe, especially around the harvesting season, harvest flies (e.g., Thirp) can invade the smoke detector chamber and give the appearance of smoke which can cause false alarms.

In some instances, it may be possible for a technician to manually inject compressed air to shew the insects out of the smoke detector chamber, for example, as part of a maintenance cycle. However, this can be costly, time consuming, and ineffective as the insects may not leave or may return to the chamber.

DETAILED DESCRIPTION

Figure 1:
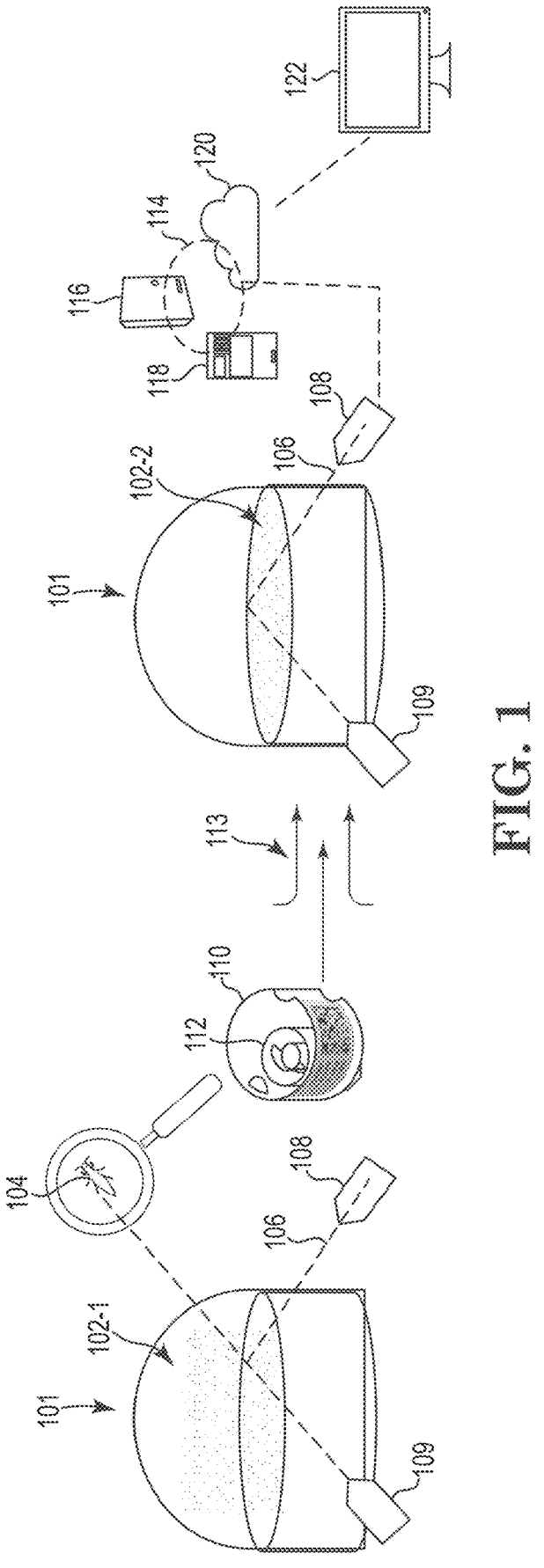
FIG. 1 is an example of a process for insect control in accordance with one or more embodiments of the present disclosure.

Devices, systems, and methods for insect control in a smoke detector device in a fire alarm system are described herein. In the present disclosure, an amount of insecticide or insect irritant can be introduced into the smoke detector chamber which will deter, disturb, or kill the insects within the chamber, thereby no longer interfering with the optical sensing apparatus being used to detect smoke.

For example, one insect controlling smoke detector device, includes a housing having a smoke detecting chamber formed therein, a light source directing a light beam through the smoke detecting chamber, a light sensor to receive a portion of the light beam and analyze the received light beam to determine whether smoke particles are present in the chamber, and an insecticide injecting apparatus to inject insecticide into the chamber.

Any suitable insecticide or irritant may be used but can preferably be non-harmful to humans. If materials harmful to humans are utilized, they can be used in small quantities or at times when humans are not present in the area where the material will be disbursed when it exits the smoke detector device.

Embodiments of the present disclosure can be utilized in self-test equipped devices and non-self-test equipped devices. Regarding self-test equipped devices, traditionally, service of fire alarm event devices included a first user (e.g., such as a technician, engineer, etc.) walking around the facility and visually checking the alarm system components, typically, at the same time as they carry out functional testing of event devices and other components of the alarm system.

For example, carrying out smoke testing of smoke detector devices and visual inspection of fire sensors could be accomplished at the same time, as the inspector is close enough to visually inspect each smoke detector device. While the first user is functionally testing and visually inspecting event devices, a second user may typically interpret signals received at the alarm system control panel at the location of the alarm system control panel based on the activities carried out by the first user.

Self-test devices are configured to initiate a smoke detection test from a remote device. Self-test devices include a smoke release apparatus that generates particulate similar to smoke particles from an actual fire event and uses the generated particulate to perform a test of the smoke detector device. Self-test device equipped systems can reduce the time it takes to test a fire system and reduce the workforce needed to test the system.

As discussed herein, self-testing devices and non-self-test devices can be less effective when insects create false alarms due to their bodies obscuring the light beam passing through the smoke detecting chamber. Accordingly, the embodiments of the present disclosure allow for mitigation of insect issues, thereby improving the ability for the fire alarm device to perform reliably.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a process for insect control in accordance with one or more embodiments of the present disclosure. As illustrated in FIG. 1, a smoke detector device has a smoke detecting chamber 101 wherein a light source 108 projects a light beam 106 through the chamber. In the chamber 101 on the left of the figure, the chamber has a number of insects 102-1 (close-up of an example insect shown at 104). Although generally referred to herein as "insects" and "insecticide", these terms are also meant to include arachnids and chemicals or other materials that irritate or kill arachnids as used herein.

In the embodiments of the present disclosure, an insecticide injecting apparatus is used to inject insecticide into the chamber. The apparatus can be of any type suitable for providing a sufficient amount of insecticide to immobilize or kill the insects.

For example, in self-test devices, a test particulate (e.g., an aerosol) release apparatus is positioned such that when the self-test is initiated, it produces a particulate similar to smoke from a fire that travels through the smoke detecting chamber to allow the optical detectors (utilizing the light source and light beam projected therefrom) to be tested to make sure they can detect smoke. In some embodiments, the particulate is created by the heating of a wax material (e.g., a solid, paraffin wax material) wherein the wax material is melted and produces the particulate. In such a self-testing device, an insecticide or irritant can be embedded into the wax material and can be released when the wax is melted.

Such a release apparatus could also be manufactured in or installed in non-self-test devices to release the insecticide or irritant. In such implementations, the wax would not need to create particulate to imitate smoke, but merely melt to release the insecticide or irritant.

An example of a release apparatus is shown in FIG. 1. It is constructed of an outer housing 110 that forms a space inside the apparatus. Within the space, a heater can be positioned for melting the wax to release the insecticide or irritant (for simplicity, insecticide is referred to hereinafter, but the reader should understand that an irritant may be used in place of the insecticide where insecticide is referred to herein) from the wax material as discussed above (not shown) or some other mechanism can be used to cause the insecticide to be airborne within the space.

The space can also include a fan 112, located within the space, in a conduit between the space and the chamber (e.g., conduit 207 of FIGS. 2A and 2B), or within the chamber 101, for directing the insecticide 113 out of the space and into the smoke detecting chamber 101. The release apparatus can be located within the smoke detecting chamber 101 or in air communication therewith to move the insecticide 113 from the space within the release apparatus into the smoke detecting chamber 101. The fan can also be used to move the insecticide out of the chamber and/or smoke detector device once the insect control process has been completed.

During the insect control process, when the insects interact with the insecticide, they can be immobilized which can cause them to fall out of the air or become detached from the inner surfaces of the smoke detecting chamber 101 (illustrated at 102-2) or smoke detecting components therein, thereby clearing the path of the light beam used for smoke detection within the chamber. In some embodiments, a sufficient amount of insecticide can be used to kill the insects, however, in some embodiments, it may be possible to provide a lower amount that will deter them from entering the chamber or incapacitate the insects for a period long enough to perform a self-test or in case of an initial indication of smoke, where the insects can be incapacitated prior to a retest after the initial indication test. When an irritant is used, it can irritate the insect in order to deter them from entering the chamber or can motivate them to move, either out of the chamber or to a different position within the chamber that is not in the path of the light beam.

The insecticide can be released at any time during operation of the smoke detector device. For example, the insecticide can be released periodically on a schedule (e.g., monthly), during high insect periods (e.g., every week during the month of May), can be initiated in conjunction with another process (e.g., in conjunction with a self-testing process), or can be initiated by a technician that is either on site or remote. For instance, the smoke detector device can include a processor and memory and can execute instructions via the processor that are stored in the memory to determine whether release of insecticide should be initiated and to initiate an insecticide release process. The determination of whether to release insecticide can be accomplished, for example, based on one or more calendar dates, time periods, and/or light sensor data as discussed herein. Such a determination can be accomplished by a processor on the smoke detector device, another smoke detector device (wherein a master device determines initiation on one or more slave devices), an alarm system control panel, and/or a remote device (handheld device used by a technician in the building or a monitoring system device located remotely from the building).

The smoke detector device can include a processor and memory, wherein the processor executes instructions stored in the memory to accomplish certain smoke detector device tasks, such as initiating a self-test or insecticide process, detecting whether there is smoke in the chamber, determining if the particulate in the chamber is test particulate or an insect, and other normal smoke detector device functions. Initiation of an insecticide release can be accomplished through executable instructions that are executed by the processor to provide scheduling or can user input via any of these devices through a user interface associated with one of the computing devices.

The smoke detector device can be connected (illustrated at 114) to a fire system control panel 116, other computing component (e.g., computing device 118), or directly to a network access device 120, which is connected to one or more remote computing devices 122. The remote computing device can be, for example, a mobile device that is used by a technician within the building and communicates, at least in part, through a gateway device of the local fire alarm system. The remote device can also be a computing device at a remote monitoring location wherein one or more fire alarm systems are monitored for alarms and are tasked with coordinating a response to the alarm (e.g., coordinating first responders, contacting building owner/management, etc.).

The memory can be any type of storage medium that can be accessed by the processor to perform various examples of the present disclosure. For example, the memory can be a non-transitory computer readable medium having computer readable instructions (e.g., executable instructions/computer program instructions) stored thereon that are executable by the processor for event device maintenance in accordance with the present disclosure. The computer readable instructions can be executable by the processor to provide the initiation and conducting of an injection of insecticide.

The memory can be volatile or nonvolatile memory. The memory can also be removable (e.g., portable) memory, or non-removable (e.g., internal) memory. For example, the memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory is illustrated as being located within the smoke detector device, embodiments of the present disclosure are not so limited. For example, memory can also be located internal to another computing resource (e.g., enabling computer readable instructions to be downloaded over the Internet or another wired or wireless connection).

As discussed above, a user (e.g., operator) can interact with the smoke detector device via user interface. For example, a user interface can provide (e.g., display and/or present) information to the user, and/or receive information from (e.g., input by) the user. For instance, in some embodiments, user interface can be a graphical user interface (GUI) that can provide and/or receive information to and/or from the user.

The display can be, for instance, a touch-screen (e.g., the GUI can include touch-screen capabilities). Alternatively, a display can include a television, computer monitor, mobile device screen, other type of display device, or any combination thereof, connected to the computing device and configured to receive a video signal output.

In some embodiments, the processor and memory can be in the form of a controller that controls a number of functions of the insecticide injection process, the self-testing process, and/or the smoke detection process. For example, the controller can execute instructions with the processor that are stored in memory to receive data regarding the portion of the light beam received by a light sensor associated with the smoke detector chamber and analyzes the data to determine whether smoke particles are present in the chamber or whether there are insects in the chamber. Further, when it has been determined that one or more insects are in the chamber, the controller initiates the injection of insecticide into the chamber.

Other functions can, for example, include: wherein the controller initiates melting of a solid having insecticide embedded therein (e.g., wherein the melting of the solid causes particles of insecticide to become airborne), wherein the controller initiates actuation of a fan apparatus to move the insecticide around within the chamber, and/or wherein the controller initiates a second actuation of the fan after a predetermined time to move the insecticide out of the chamber.

As an additional example, user interface can include a keyboard and/or mouse the user can use to input information. Embodiments of the present disclosure, however, are not limited to a particular type(s) of user interface.

Figure 2A:
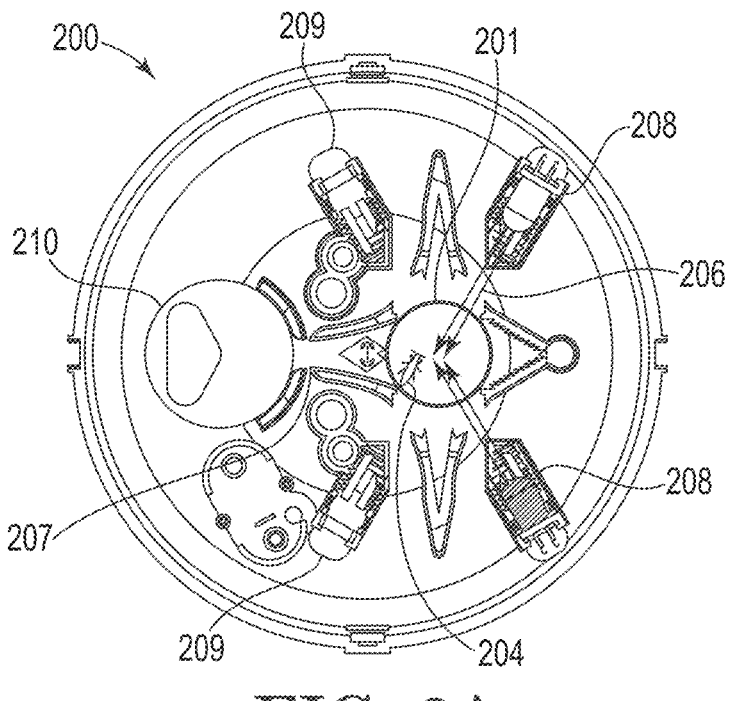
FIG. 2A is an example of a smoke detector device before utilizing the insect control process in accordance with one or more embodiments of the present disclosure.

FIG. 2A is an example of a smoke detector device before utilizing the insect control process in accordance with one or more embodiments of the present disclosure. In FIG. 2A, the smoke detector device 200 includes a smoke detecting chamber 201, with an insect 204 therein.

One or more light sources 208 each direct a light beam 206 across the chamber 201 to a particle sensor 209 that detects the light from the light beam and can determine whether there are smoke particles reducing the transmissivity of the light beam in the chamber, based on the amount of light the sensor receives. When one or more insects are in the path of the light beam, the reduction of light blocked by the insect(s) can result in the detector believing there is smoke in the chamber rather than insect(s).

The particulate can, for example, include particles used to self-test the light sensor. For instance, the particles can be airborne wax particles. The particulate injecting apparatus can also inject insecticide particles and particles used for self-testing of the light sensor, in some embodiments. The particulate injecting apparatus can inject insecticide particles at a first time period and particles used for self-testing of the light sensor at a second time period.

Figure 2B:
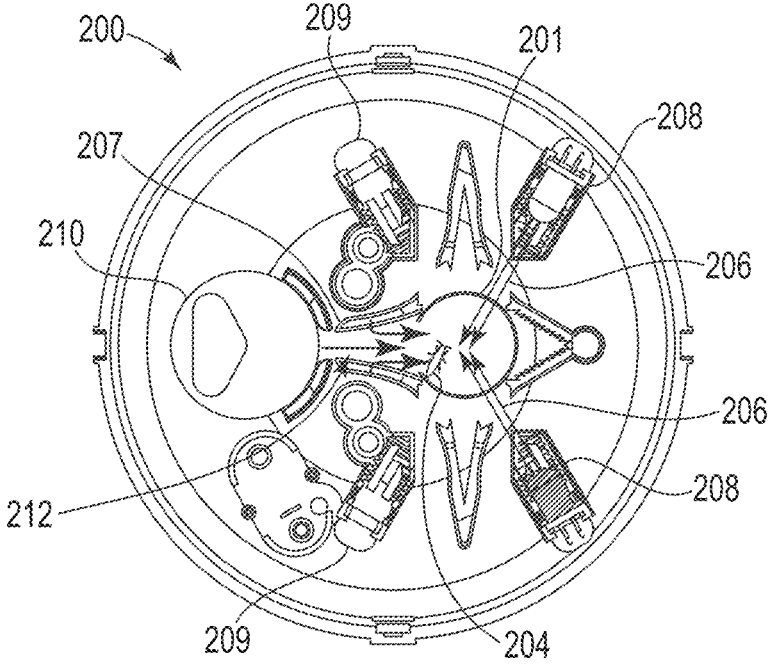
FIG. 2B is an example of a smoke detector device during utilization of the insect control process in accordance with one or more embodiments of the present disclosure.

FIG. 2B is an example of a smoke detector device during utilization of the insect control process in accordance with one or more embodiments of the present disclosure. Accordingly, as described herein, embodiments of the present disclosure can include a release apparatus. An example is illustrated at 210. In this embodiment, the release apparatus creates airborne insecticide or irritant particles 212 and a fan or other mechanism provided to move the particulate 212 moves it from the insecticide release apparatus 201 into the smoke detector chamber 201 (e.g., via conduit 207).

This embodiment is also designed to perform a smoke self-test. When a self-test is initiated, a heating element in the release apparatus 210 heats a solid wax material to create airborne wax particles that imitate smoke particles for purposes of testing the smoke detector device 200.

In this manner, insects can be relocated or eliminated to allow the smoke detector device to operate properly. The embodiments of the present disclosure reduces the amount of false alarms, thereby, increasing the reliability of the devices and customer satisfaction.

As discussed herein, the embodiments of the present disclosure can be beneficial in providing reduced insect interference with smoke detection. Such embodiments can reduce technician time and the number of skilled technicians on site, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An insect controlling smoke detector device, comprising:

a housing having a smoke detecting chamber formed therein;

a light source directing a light beam through the smoke detecting chamber;

a light sensor to receive a portion of the light beam and analyze the received light beam to determine whether smoke particles are present in the chamber;

an insecticide release apparatus located in air communication with the smoke detecting chamber via a conduit that creates airborne insecticide within the smoke detecting chamber to cause any insects therein to become detached from an inner surface of the smoke detecting chamber thereby clearing any insects therein from a path of the light beam through the smoke detecting chamber; and a fan located within the conduit between the insecticide release apparatus and the smoke detecting chamber to:

move the insecticide from the insecticide release apparatus into the smoke detecting chamber;

move the insecticide around within the smoke detecting chamber; and move the insecticide out of the smoke detecting chamber after the insects therein have become detached from the inner surface of the smoke detecting chamber.

2. The insect controlling smoke detector device of claim 1, wherein the insecticide is embedded in a solid.

3. The insect controlling smoke detector device of claim 1, wherein the insecticide is embedded in a wax material.

4. The insect controlling smoke detector device of claim 3, wherein the wax material is heated and the insecticide becomes airborne.

5. The insect controlling smoke detector device of claim 3, wherein the wax material is a paraffin wax material.

* * * * *